United States Patent
Apte et al.

(10) Patent No.: US 9,892,122 B2
(45) Date of Patent: Feb. 13, 2018

(54) METHOD AND APPARATUS FOR DETERMINING A RANGE OF FILES TO BE MIGRATED

(71) Applicant: International Business Machines Corporation, Armonk, NY (US)

(72) Inventors: Ajay A. Apte, Austin, TX (US); Pu Jin, Beijing (CN); Ying Liu, Beijing (CN); Fanjing Meng, Beijing (CN); Kewei Sun, Beijing (CN); Jingmin Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 14/433,467

(22) PCT Filed: Sep. 2, 2013

(86) PCT No.: PCT/CN2013/082761
§ 371 (c)(1),
(2) Date: Apr. 3, 2015

(87) PCT Pub. No.: WO2014/056371
PCT Pub. Date: Apr. 17, 2014

(65) Prior Publication Data
US 2015/0261766 A1   Sep. 17, 2015

(30) Foreign Application Priority Data

Oct. 10, 2012   (CN) .......................... 2012 1 0382069

(51) Int. Cl.
*G06F 17/30*   (2006.01)
*G06F 9/45*   (2006.01)

(52) U.S. Cl.
CPC .......... *G06F 17/30079* (2013.01); *G06F 8/51* (2013.01); *G06F 17/30138* (2013.01)

(58) Field of Classification Search
CPC ................................................. G06F 11/1469
(Continued)

(56) References Cited

U.S. PATENT DOCUMENTS

| 7,805,721 | B2 | 9/2010 | Feinleib et al. |
| 8,108,456 | B2 | 1/2012 | Chen et al. |

(Continued)

FOREIGN PATENT DOCUMENTS

| CN | 101281461 A | 10/2008 |
| CN | 101645003 A | 2/2010 |

(Continued)

OTHER PUBLICATIONS

Search Report PCT/CN2013/082761.
Official Action dated Apr. 27, 2016, received from the Chinese Patent Office, 201210382069.6.

*Primary Examiner* — Baoquoc N To
(74) *Attorney, Agent, or Firm* — Scully, Scott, Murphy & Presser, P.C.; David M. Quinn, Esq.

(57) ABSTRACT

A method for determining a range of files to be migrated is disclosed, comprising: comparing the source system environment to be migrated with a set of incremental target system environments, to discover the change files in each of the target system environments relative to the source system environment, wherein each target system environment in the set of incremental target system environments comprises software on which the migration target application depends, and the software contained in the different target system environments is incremental; classifying the change files into different change patterns according to the change types of the change files in each comparison and the different change types of the change files among multiple comparisons; and determining a range of files to be migrated according to the change pattern.

17 Claims, 10 Drawing Sheets

Apparatus for determining a range of files to be migrated

(58) Field of Classification Search
USPC .......................................................... 707/645
See application file for complete search history.

(56) References Cited

U.S. PATENT DOCUMENTS

| | | | |
|---|---|---|---|
| 2003/0154314 A1* | 8/2003 | Mason, Jr. | ........ H04L 29/12009 |
| | | | 709/250 |
| 2007/0240143 A1 | 10/2007 | Guminy et al. | |
| 2008/0270515 A1 | 10/2008 | Chen et al. | |
| 2009/0241100 A1* | 9/2009 | Sakurai | ............... G06F 11/1433 |
| | | | 717/170 |
| 2010/0031251 A1 | 2/2010 | Hsieh | |
| 2010/0205599 A1 | 8/2010 | Vaidya et al. | |
| 2010/0274750 A1* | 10/2010 | Oltean | ............. G06F 17/30115 |
| | | | 706/47 |
| 2011/0276684 A1 | 11/2011 | Singh et al. | |
| 2013/0024922 A1* | 1/2013 | Rodriguez | ............ G06F 9/5072 |
| | | | 726/6 |

FOREIGN PATENT DOCUMENTS

| | | |
|---|---|---|
| CN | 101907989 A | 12/2010 |
| CN | 102467529 A | 5/2012 |

* cited by examiner

| Comp. # | Change table | Source | Target | Number of change files after cleansing ||| Number of change files |||
|---|---|---|---|---|---|---|---|---|---|
| | | | | only in the source | only in the target | in the source and target, but with different contents | only in the source | only in the target | in the source and target, but with different contents |
| 1 | CT1 | source environ. | OS | 23,506 | 1 | 40 | 23,506 | 1 | 40 |
| 2 | CT2 | source environ. | OS+MW | 496 | 13 | 104 | 496 | 13 | 104 |
| 3 | CT3 | source environ. | OS+MW+App | 59 | 27 | 113 | 75 | 91 | 157 |

Comparison summary

Fig. 5

CT1 – Change table (source vs. OS) - 23,547#

| # | File name | Change types | | |
|---|---|---|---|---|
| | | F(y,0) | F(0,y) | F(y,y) |
| 1 | /opt/.ibm/ | 1 | | |
| 2 | /opt/.ibm/.nif/ | 1 | | |
| 3 | /opt/.ibm/.nif/.nifregistry | 1 | | |
| 4 | /opt/IBM/ | 1 | | |
| 5 | /opt/IBM/WebSphere/ | | | |
| ... | ... | ... | ... | ... |
| 23507 | /lib/udev/rules.d/75-persistent-net-generator.rules/etc/hosts/etc/resolv.conf | | 1 | |
| 23508 | /etc/hosts | | | 1 |
| 23509 | /etc/resolv.conf | | | 1 |
| ... | ... | ... | ... | ... |
| 23541 | /var/run/consolekit-daemon.pid | | | 1 |
| 23542 | /var/run/sm-notify.pid | | | 1 |
| 23543 | /var/run/utmp | | | 1 |
| 23544 | /var/spool/abrt/ccpp2012-05-11-16:09:07-1474/count | | | 1 |
| 23545 | /var/spool/mail/root | | | 1 |
| 23546 | /var/spool/plymouth/boot.log | | | 1 |
| 23547 | /var/run/consolekit-daemon.pid | | | 1 |

Fig. 6

| # | CT2 - Change table (source vs. OS+MW) - 613# | | | |
|---|---|---|---|---|
| | File name | Change type | | |
| | | F(y,0) | F(0,y) | F(y,y) |
| 1 | /opt/IBM/WebSphere/AppServer/profiles/AppSrv01/config/cells/lboatNode01Cell/applications/Trade.ear/ | 1 | | |
| 2 | /opt/IBM/WebSphere/AppServer/profiles/AppSrv01/config/cells/localhostNode01Cell/applications/Trade.ear/Trade.ear | 1 | | |
| 3 | /opt/IBM/WebSphere/AppServer/profiles/AppSrv01/config/cells/localhostNode01Cell/applications/Trade.ear/eltas/ | 1 | | |
| 4 | /opt/IBM/WebSphere/AppServer/profiles/AppSrv01/config/cells/localhostNode01Cell/applications/Trade.ear/deltas/Trade/ | 1 | | |
| ... | ... | ... | ... | ... |
| 496 | /var/log/sa/sa15 | 1 | | |
| 497 | /lib/udev/rules.d/75-persistentnet-generator.rules | | 1 | |
| 498 | /opt/IBM/WebSphere/AppServer/profiles/AppSrv01/configuration/org.eclipse.osgi/.bundledata.2 | | 1 | |
| 499 | /opt/IBM/WebSphere/AppServer/profiles/AppSrv01/configuration/org.eclipse.osgi/.lazy.2 | | 1 | |
| 500 | /opt/IBM/WebSphere/AppServer/properties/version/wasdirectory.trace_2012.05.14_10.54.23.099.txt.lck | | 1 | |
| 501 | /etc/adjtime | | | 1 |
| ... | ... | | ... | ... |
| 612 | /var /spool/mail/root | | | 1 |
| 613 | / var/spool/plymouth/boot.log | | | 1 |

Fig. 7

| CT3 - Change table (source vs. OS+MW+App) - 323# | | Change types | | |
|---|---|---|---|---|
| # | File name | F(y,0) | F(0,y) | F(y,y) |
| 1 | /opt/IBM/WebSphere/AppServer/profiles/AppSrv01/config/cells/localhostNode01Cell/applications/Trade.ear/deltas/Trade/delta-1337067250498 | 1 | | |
| 2 | /opt/IBM/WebSphere/AppServer/profiles/AppSrv01/config/cells/localhostNode01Cell/buses/ | 1 | | |
| 3 | /opt/IBM/WebSphere/AppServer/profiles/AppSrv01/config/cells/localhostNode01Cell/buses/localhostNode01/ | 1 | | |
| 4 | /opt/IBM/WebSphere/AppServer/profiles/AppSrv01/config/cells/localhostNode01Cell/buses/localhostNode01/si b- authorisations.xml | 1 | | |
| ... | ... | ... | ... | ... |
| 75 | /var/log/sa/sa15 | 1 | | |
| 76 | /lib/udev/rules.d/75-persistent-net- generator.rules | | 1 | |
| 77 | /opt/IBM/WebSphere/AppServer/profiles/AppSrv01/config/cells/localhostNode01Cell/applications/Trade.ear/deltas/Trade/delta-1336966777263 | | 1 | |
| ... | ... | ... | ... | ... |
| 165 | /root/.java/.userPrefs/92668751/prefs.xml | | 1 | |
| 166 | /etc/ adjtime | | ... | ... |
| ... | ... | ... | ... | ... |
| 322 | /var /spool/mail/root | | | 1 |
| 323 | / var/spool/plymouth/boot.log | | | 1 |

Fig. 8

| # | Cleansed CT3 - Change table (source vs. OS+MW+App) - 199# | | | |
|---|---|---|---|---|
| | File name | Change types | | |
| | | F(y,0) | F(0,y) | F(y,y) |
| 1 | /opt/IBM/WebSphere/AppServer/profiles/AppSrv01/config/cells/localhostNode01Cell/applications/Trade.ear/deltas/Trade/delta 13370672504998 | 1 | | |
| 2 | /opt/IBM/WebSphere/AppServer/profiles/AppSrv01/config/cells/localhostNode01Cell/buses/ | 1 | | |
| 3 | /opt/IBM/WebSphere/AppServer/profiles/AppSrv01/config/cells/localhostNode01Cell/buses/localhostNode01/ | 1 | | |
| 4 | /opt/IBM/WebSphere/AppServer/profiles/AppSrv01/config/cells/localhostNode01Cell/buses/localhostNode01/sib-authorisations.xml | 1 | | |
| ... | ... | ... | ... | ... |
| 56 | /opt/sqllib/ | 1 | | |
| 57 | /opt/sqllib/java/ | 1 | | |
| 58 | /opt/sqllib/java/db2jcc.jar | 1 | | |
| 59 | /opt/sqllib/java/db2jcc_license_cu.jar | 1 | | |
| 60 | /lib/udev/rules.d/75-persistent-net-generator.rules | | 1 | |
| 61 | /opt/IBM/WebSphere/AppServer/profiles/AppSrv01/consolepreferences/ | | 1 | |
| 62 | /opt/IBM/WebSphere/AppServer/profiles/AppSrv01/consolepreferences/92668751/ | | 1 | |
| ... | ... | ... | ... | ... |
| 195 | /var/lib/rpm/__db.002 | | | 1 |
| 196 | /var/lib/rpm/__db.004 | | | 1 |
| 197 | /var/spool/abrt/ccpp-2012-05-11-16:09:07.1474/count | | | 1 |
| 198 | /var/spool/mail/root | | | 1 |
| 199 | /var/spool/plymouth/boot.log | | | 1 |

Fig. 9

| Change patterns | CT1 F(0,y) | CT1 F(y,y) | CT1 F(y,0) | CT2 F(0,y) | CT2 F(y,y) | CT2 F(y,0) | CT3 F(0,y) | CT3 F(y,y) | Diff(y,y) (CT1,CT2) | Diff(y,y) (CT2,CT3) | File category | File examples |
|---|---|---|---|---|---|---|---|---|---|---|---|---|
| CP1 | 1 | | | | | | | | N/A | N/A | Ad-hoc configs. / 3rd party components / Middleware config. files / Other irrelevant files | /opt/ POT_config/database.xml ; /lib/libcplex101.so ; /opt/IBM/WebSphere/AppServer/profiles/managed01/config/cells/vm201Cell/cell.xml ; /root/tool/Osi 0.98.2-linux-x86_64-icc9.1.tgz |
| CP2 | | | | 1 | | | 1 | | N/A | 0 | Irrelevant middleware files | /opt/IBM/HTTPServer/Plugins/properties/version/nif/config/uninstall/99SBootStrapIHSUninstall07262012073224 8.ant |
| CP3 | 1 | | | 1 | | | 1 | | 0 | 0 | Irrelevant OS files | /var/lib/prelink/force |
| CP4 | 1 | | | | | 1 | | 1 | N/A | N/A | App. config. files in app. archive | /opt/IBM/WebSphere/AppServer/profiles/managed01/InstalledApps/vm201Cell/pot.ear/pot.war/optimizer.xml |
| CP5 | 1 | | | | 1 | | | 1 | N/A | 0 | Middleware config. files / Irrelevant middleware files | /opt/IBM/ HTTPServer/conf/httpd.conf ; /opt/IBM/ HTTPServer/conf/httpd.conf var/lib/rpm/__db.001 |
| CP6 | | 1 | | | 1 | | | 1 | 0 | 0 | OS config. files / Middleware in OS config. files | /etc/hosts ; /etc/sysconfig/network ; /etc/passwd |
| CP7 | | 1 | | | | | | | 1 | 0 | Irrelevant OS files | /etc/sysconfig/networking/profiles/default/ifctg-eth0 ; /etc/adjtime |
| CP8 | 1 | | | | | | | | | | Middleware files | Opt/IBM/WebSphere/AppServer/bin/augmentProxyServer.sh |
| CP9 | 1 | | | | | 1 | | | | | App. files | Opt/IBM/WebSphere/AppServer/profiles/ApSrv01/config/cells/localhostNode01Cell/applications/Trade.ear/ |

Fig. 10

METHOD AND APPARATUS FOR DETERMINING A RANGE OF FILES TO BE MIGRATED

CROSS-REFERENCE TO RELATED APPLICATIONS

This application is based on and claims the benefit of priority of the filing date of commonly-owned, co-pending on PCT Application No. PCT/CN2013/082761 filed Sep. 2, 2013, which further claims the benefit of priority from commonly-owned Chinese Patent Application 201210382069.6, filed on Oct. 10, 2012.

FIELD OF THE INVENTION

The present invention relates to the computer field, particularly to migration of an application and its corresponding software stack, and more particularly to a method and apparatus for determining a range of files to be migrated.

BACKGROUND OF THE INVENTION

With the wide adoption of cloud computing and continuous server consolidation, there are huge requirements to migrate an existing software stack (i.e., a set of software subsystems or components cooperating with each other to provide some solution, e.g., an operating system, middleware, a database and an application) from a source environment to a target environment (e.g., cloud or consolidated servers). However, migrating an existing software stack to cloud or consolidated servers is an extremely complicated activity.

One of the key challenges is to understand the source environment in terms of discovering software stack configurations and depended components given the situation that such software have been running for a long time and already have many configurations which are not well documented.

Software, especially distributed enterprise software, is highly diverse. These diversities lie in:

1. In terms of software configuration descriptions, it comprises: standard configurations using standard (e.g. JEE, OSGi) compliant deployment descriptors or annotations to specify configurations; ad-hoc configurations that use non-standard ad-hoc metadata to specify configurations in files like *.xml, *.properties, etc.; and hard-wired configurations that hard-code some configurations in binary files.

2. In terms of software running environment configuration, different products have their specific configuration formats; and different versions of the same product may also have different configurations, e.g., the configuration file formats of various JEE application server software are different from each other;

3. In terms of software depended resources, it comprises: common third party frameworks (e.g., Spring, Hibernate, Axis, etc.); specific third party components (e.g., cplex.jar, cplex.dll, cbc.dll, etc.); and native components (e.g., *.jar, *.dll, *.war, *.ear, etc.)

Given the above-mentioned diversities of software configurations and a huge number of files (tens thousands or even more) in a source environment, it is a pending problem how we can identify a reasonable size of files that include all the software configurations and depended resources that are necessary for the running of the migration target application.

Currently there are the following solutions to this problem:

The first is questionnaire, e.g. using spreadsheets or Word documents, or tools like Rational Focal Point, etc. However, this method relies heavily on the human knowledge of the source environment and software, and thus is an error-prone method.

The second is automation approach on known products (e.g. WebSphere Application Server (WAS)). For example, RAF (Rational Automation Framework), which can extract the configurations of specific products (e.g. WAS); UCM (Unix Configuration Migration Tool), which is a product specific plug-in for extracting product specific configurations; TADDM (Tivoli Application Dependency Discovery Manager), which extracts software dependencies based on agents which are product dependent. However, this automation approach relies on knowledge of specific products, and cannot process unknown products, native components or ad-hoc configurations.

It can be seen that an improved method for determining a range of files to be migrated for the migration target application is needed in the art.

SUMMARY OF THE INVENTION

In an aspect of the present invention, there is provided a method for determining a range of files to be migrated, comprising: successively comparing the source system environment to be migrated with a set of incremental target system environments, to discover change file in each of the target system environments relative to the source system environment, wherein each target system environment in the set of incremental target system environments comprises software on which the migration target application depends, and the software contained in the different target system environments is incremental; classifying the change files into different change patterns according to the change types of the change files in each comparison and the different change types of the change files among multiple comparisons; and determining a range of files to be migrated according to the change patterns.

In another aspect of the present invention, there is provided an apparatus for determining a range of files to be migrated, comprising: a comparing module configured to successively compare the source system environment to be migrated with a set of incremental target system environments, to discover the change files in each target system environment relative to the source system environment, wherein each target system environment in the set of incremental target system environments comprises software on which the migration target application depends, and the software contained in the different target system environments is incremental; a change pattern classifying module configured to classify the change files into different change patterns according to the change types of the change files in each comparison and the different change types of the change files among multiple comparisons; and a migrating file range determining module for determining a range of files to be migrated according to the change patterns.

The present invention can significantly reduce the range of software stack configurations to be migrated, greatly facilitating the migration of an application from the source system environment to the target system environment, and the present invention is automatic and general, without requiring large amounts of artificial interference or knowledge of specific products.

DESCRIPTION OF ACCOMPANYING DRAWINGS

Through the more detailed description of exemplary embodiments of the present disclosure when read in conjunction with the accompanying drawings, the above and other objects, features and advantages of the present disclosure will become more apparent, wherein the same reference numerals generally refer to the same components in the exemplary embodiments of the present disclosure.

FIG. 5 shows a summary of the change files in the change tables CT1, CT2, CT3 that are generated in the exemplary comparison process shown in FIG. 4, and a summary of the change files in the change table CT3 after the step of cleansing irrelevant files has been performed on CT3;

FIG. 6 shows part of the exemplary contents in the change table CT1 that is generated in the exemplary comparison process shown in FIG. 4;

FIG. 7 shows part of the exemplary contents in the change table CT2 that is generated in the exemplary comparison process shown in FIG. 4;

FIG. 8 shows part of the exemplary contents in the change table CT3 that is generated in the exemplary comparison process shown in FIG. 4;

FIG. 9 shows part of the exemplary contents in the change table CT3 that is generated in the exemplary comparison process shown in FIG. 4 after the step of cleansing has been performed thereon.

FIG. 10 shows the results of classifying to different patterns the change files in the change tables CT1, CT2, CT3 that are generated in the comparison process shown in FIG. 4.

DETAILED DESCRIPTION OF SPECIFIC EMBODIMENTS

Figure 1:
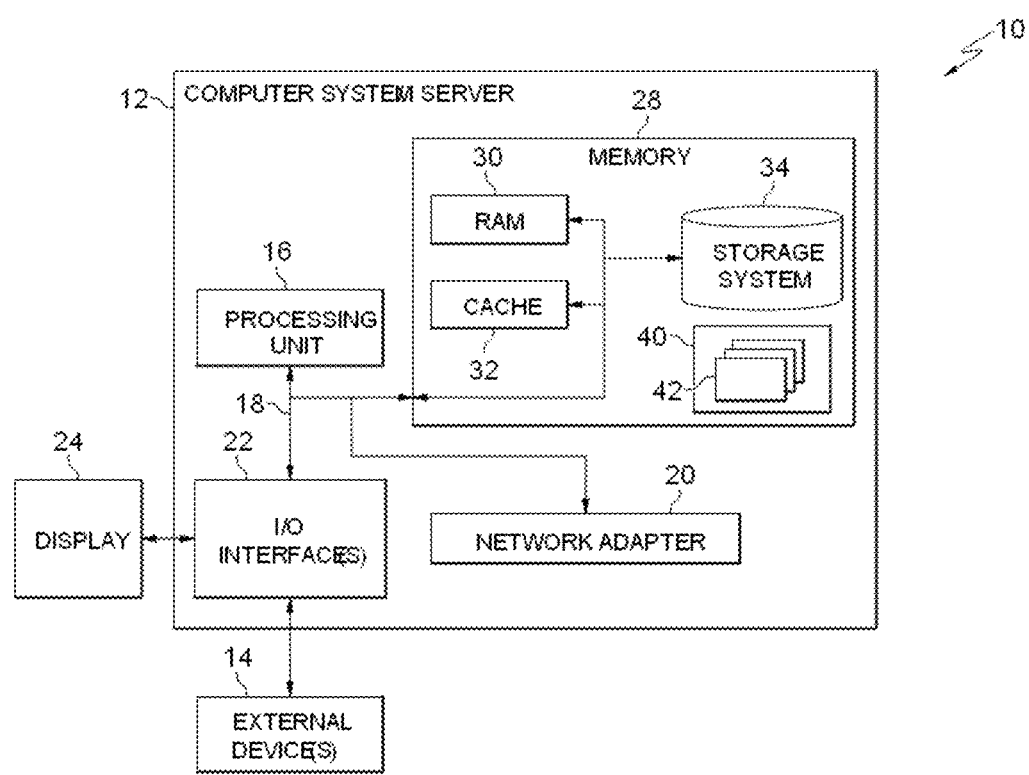
FIG. 1 shows a block diagram of an exemplary computer system/server 12 which is applicable to implement embodiments of the present invention.

Preferred embodiments of the present disclosure will be described in more detail with reference to the accompanying drawings. It will be understood, however, that the present disclosure can be implemented in various manners, with no constraints by the embodiments disclosed herein. On the contrary, those embodiments are provided for a thorough and complete understanding of the present disclosure, and for fully conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The embodiments of the present invention will be described with reference to the accompanying drawings. It should be pointed out that words like "first", "second" in the following description is merely for the convenience of description to distinguish difference elements, without indicating any sequence or succession.

Figure 2:
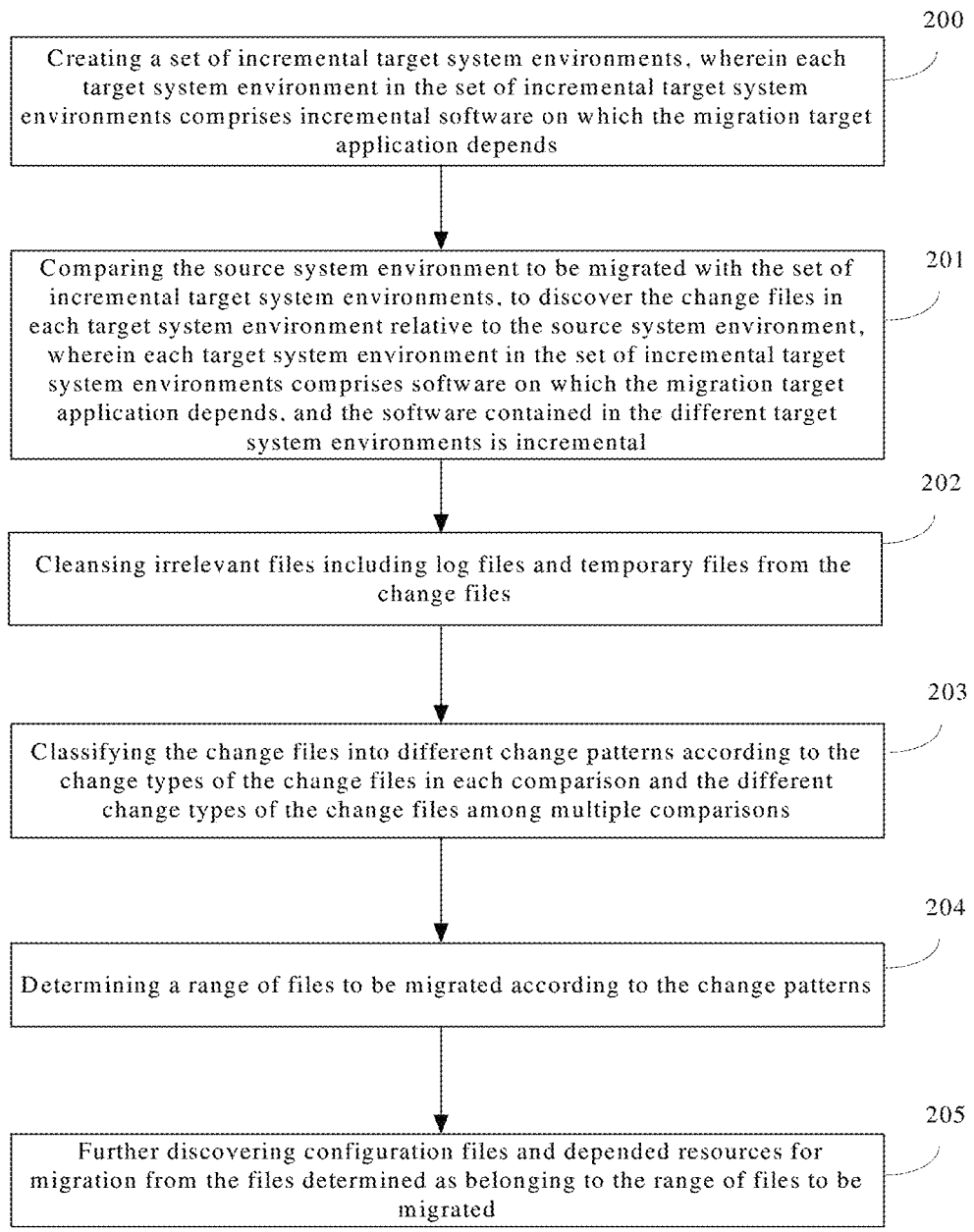
FIG. 2 shows a method for determining a range of files to be migrated according to an embodiment of the present invention.

A Method for Determining a Range of Files to be Migrated According to an Embodiment of the Invention Now referring to FIG. 2, it shows a method for determining a range of files to be migrated according to an embodiment of the present invention. As shown, the method comprises the following steps:

In step 201, the source system environment to be migrated is successively compared with a set of incremental target system environments, to discover the change files in each of the target system environments relative to the source system environment, wherein each target system environment in the set of incremental target system environments comprises software on which the migration target application depends, and the software contained in the different target system environments is incremental. That is to say, the source system environment to be migrated is successively compared with each of the set of target system environments, to discover the files that have changed in the source system environment and target system environment; each of the set of target system environments has software installed on which the running of the migrating target application depends, and the software installed in different target system environments is incremental, for example, in the first target system environment is installed a first layer of software in the software stack on which the running of migration target application depends, in the second target system environment is installed a first layer and a second layer of software in the software stack on which the running of migration target application depends, in the third target system environment is installed a first layer, second layer and third layer of software in the software stack on which the running of migration target application depends, and so on.

In step 203, the change files are classified into different change patterns according to the change types of the change files in each comparison and the different change types of the change files among multiple comparisons. The change pattern actually refers to the specific change type combination of a change file in multiple comparisons.

In step 204, a range of files to be migrated is determined according to the change patterns.

According to an embodiment of the present invention, the change types include: a first change type in which the file is present only in the source system environment, a second change type in which the file is present only in the target system environment, and a third change type in which the file is present both in the source system environment and in the target system environment but the contents of the file are different.

According to an environment of the present invention, in classifying the change files to different change patterns, not only the change types of the change files in each comparison and the different change types of the change files among multiple comparisons are considered, but also whether the changed contents of the file (i.e., the difference of the file in the source system environment and in the target system environment) in one comparison is the same as the changed contents of the file in another comparison is considered.

According to an embodiment of the present invention, the set of incremental target system environments include a first target system environment with only the operating system on which the migration target application depends installed, a second target system environment with the operating system and the middleware on which the migration target application depends installed, and a third target system environment with the operating system and the middleware on which the migration target application depends and the migration target application itself installed. According to a further embodiment of the present invention, the operating system, middleware and migration target application in the respective target system environments may be without any configuration performed. Of course, in other embodiments of the present invention, the set of incremental target system environments may include a different number of other target system environments with different software in the software stack installed.

According to an embodiment of the present invention, the method may further comprise the optional step 200 of creating the set of incremental target system environments. For example, for the above embodiment, the first target system environment, the second target system environment and the third target system environment may be created. To this end, firstly the source system environment may be analyzed to obtain the list of software installed thereon, and the software stack on which the application depends, i.e. a set of software in the list of software, is determined according to the type of the application to be migrated, so as to determine how to create the set of target system environments. For example, for a typical WAS-based JEE application, software associated with JEE may be selected from the list of software installed in the source system environment, and according to its dependencies, the three target system environments to be generated may be obtained, i.e. that with only the operating system installed, that with the operating system and the middleware installed, and that with the operating system, the middleware and the application installed but not configured yet.

According to an embodiment of the present invention, the step 203 of classifying the change files into different change patterns according to the change types of the change files in each comparison and the different change types of the change files among multiple comparisons comprises at least one of the following:

classifying the files that belong to the first change type in the first comparison, to the first change type in the second comparison and to the first change type in the third comparison into a first change pattern;

classifying the files that belong to the first change type in the first comparison, to the first change type in the second comparison and to the third change type in the third comparison into a fourth change pattern;

classifying the files that belong to the first change type in the first comparison, to the third change type in the second comparison and to the third change type in the third comparison into a fifth change pattern;

classifying the files that belong to the third change type in the first comparison, to the third change type in the second comparison and to the third change type in the third comparison into a sixth change pattern, wherein the file difference between the source system environment and target system environment in the first comparison, the file difference between the source system environment and target system environment in the second comparison and the file difference between the source system environment and target system environment in the third comparison are the same;

and wherein the step 204 of determining a range of files to be migrated according to the change patterns comprises: determining that the files in at least one of the first change pattern, the fourth change pattern, the fifth change pattern and the sixth change pattern belong to the range of files to be migrated.

It is to be noted that, classifying the files into the respective specific change patterns in the above embodiment is only exemplary, rather than limitation to the present invention. In other embodiments of the present invention, the files may be classified into more, less or different change patterns, and the files in these change patterns may be determined as belonging to the range of files to be migrated.

According to a further embodiment of the present invention, the determining that the files in the first change pattern, the fourth change pattern, the fifth change pattern and the sixth change pattern belong to the range of files to be migrated further comprises the following sub-steps:

for the files in the first change pattern, clustering the files into ad-hoc configuration files, third-party components, middleware configuration files and other irrelevant files, and determining that the ad-hoc configuration files, third-party components and middleware configuration files belong to the range of files to be migrated;

for the files in the fourth change pattern, determining that the files are application configuration files in an application archive, and determining that they belong to the range of files to be migrated;

for the files in the fifth change pattern, clustering the files into middleware configuration files and irrelevant configuration files, and determining that the middleware configuration files belong to the range of files to be migrated; and for the files in the sixth change pattern, clustering the files into operating system configuration files, middleware in the operating system configuration files and irrelevant operating system files, and determining that the operating system configuration files and middleware in the operating system configuration files belong to the range of files to be migrated.

Clustering the files in a change pattern may be carried out in various ways. For example, the files may be clustered according to the directories in which the files are located, the file creation dates, etc, and they may also be clustered based on knowledge of specific software.

It is to be noted that, determining or clustering the files in the respective change patterns into different file categories is only exemplary, rather than limitation to the present invention. In other embodiments of the present invention, the files in the change patterns may be determined or clustered into different file categories.

According to an embodiment of the present invention, the step 203 of classifying the change files into different change patterns according to the change types of the change files in each comparison and the different change types of the change files among multiple comparisons further comprises at least one of:

classifying the files that belong to no change type in the first comparison, to the second change type in the second comparison and to the second change type in the third comparison into a second change pattern, wherein the file difference between the source system environment and target system environment in the second comparison and the file difference between the source system environment and target system environment in the third comparison are the same;

classifying the files that belong to the second change type in the first comparison, to the second change type in the second comparison and to the second change type in the third comparison into a third change pattern, wherein the file difference between the source system environment and target system environment in the first comparison, the file difference between the source system environment and target system environment in the second comparison and the file difference between the source system environment and target system environment in the third comparison are the same;

classifying the files that belong to the third change type in the first comparison, to the third change type in the second comparison and to the third change type in the third comparison into a seventh change pattern, wherein the file difference between the source system environment and target system environment in the first comparison and the file difference between the source system environment and target system environment in the second comparison are different, while the file difference between the source system environment and target system environment in the second comparison and the file difference between the source system environment and target system environment in the third comparison are the same;

classifying the files that belong to the first change type in the first comparison, to no change type in the second comparison and to no change type in the third comparison into an eighth change pattern, and classifying the files that belong to the first change type in the first comparison, to the first change type in the second comparison and to no change type in the third comparison into a ninth change pattern, and wherein the determining the range of files to be migrated according to the change patterns comprises at least one of the following:

determining that the files in the second change pattern are irrelevant middleware files that are not to be migrated;

determining that the files in the third change pattern are irrelevant operating system files that are not to be migrated;

determining that the files in the seventh change pattern are irrelevant operating system files that are not to be migrated;

determining that the files in the eighth change pattern are middleware files already present in the second target system environment and the third target system environment and thus not to be migrated; and determining that the files in the ninth change pattern are migration target application files already present in the third target system environment and thus not to be migrated.

It is to be noted that, classifying the files into the respective specific change patterns in the above embodiment is only exemplary, rather than limitation to the present invention. In other embodiments of the present invention, the files may be classified into more, less or different change patterns, and the files in these change patterns may be determined as belonging to different file categories.

According to an embodiment of the present invention, the change files and their change types discovered in each comparison may be recorded in a change file table (e.g. the tables CT1, CT2, CT3 illustrated in the following FIGS. 6, 7, 8 respectively). Then the change files recorded in the respective change file tables are classified into the change patterns according their change types.

According to an embodiment of the present invention, the method further comprises the following optional step 202 before the step 203 of classifying the change files into different change patterns: cleansing irrelevant files including log files and temporary files from the change files. In this optional step 202, other files determined to be irrelevant may also be cleansed from the change files. There are multiple ways to determine whether a change file is a log file or temporary file, e.g., according to attributes such as the file directory in which the change file is located, the file name extension, etc. Of course, in some embodiment of the present invention, the method may not comprise the option step 202.

According to an embodiment of the present invention, irrelevant files may be cleansed only from the change file generated in the third comparison (e.g. files in CT3), while the change file generated in the first and second comparisons (e.g. files in CT1 and CT2) may not be cleansed.

According to an embodiment of the present invention, the method further comprises the following optional step 205: further discovering configuration files and depended resources for migration (e.g. third party components on which the migration target application depends) from the files determined as belonging to the range of files to be migrated. There are multiple ways to discover configuration files and depended resources for migration from the determined range of files to be migrated, for example, the knowledge of the migration target application and its software stack (e.g. the directories in which the files are located, file names or file name extensions, etc) may be utilized to discover configuration files and depended resources for migration from the determined range of files to be migrated. Of course, in some embodiments of the present invention, the method may exclude the optional step 205.

According to an embodiment of the present invention, the method may further comprise the following optional step: migrating the files determined as belonging to the range of files to be migrated to the third target system environment after adjustment. For example, the files in the first change pattern which are clustered into ad-hoc configuration files, third party components, and middleware configuration files may be copied to the third target system environment after necessary adjustment. The adjustment may be carried out based on the knowledge of the migration target application and its software stack. In other embodiments of the present invention, the files determined as belonging to the range of files to be migrated may be migrated to other target system environments other than the third target system environment after adjustment. Of course, in some embodiments of the present invention, the method may not comprise this optional step.

Figure 3:
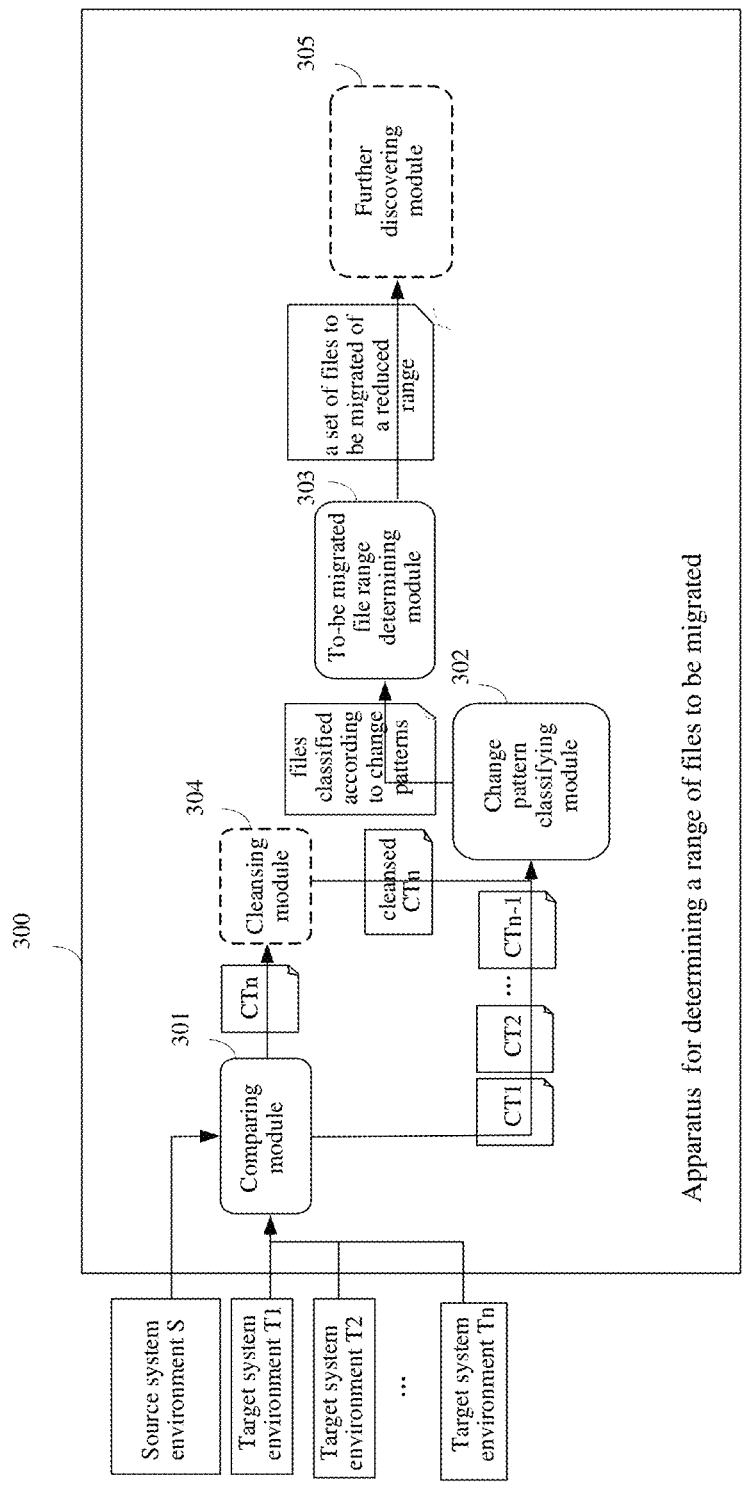
FIG. 3 shows an apparatus for determining a range of files to be migrated according to an embodiment of the present invention.

An Apparatus for Determining a Range of Files to be Migrated According to an Embodiment of the Present Invention Now referring to FIG. 3, it shows an apparatus 300 for determining a range of files to be migrated according to an embodiment of the present invention. As shown, the apparatus 300 comprises:

a comparing module 301 configured to successively compare the source system environment to be migrated with a set of incremental target system environments, to discover the change files in each target system environment relative to the source system environment, wherein each target system environment in the set of incremental target system environments comprises software on which the migration target application depends, and the software contained in the different target system environments is incremental;

a change pattern classifying module 302 configured to classify the change files into different change patterns according to the change types of the change files in each comparison and the different change types of the change files among multiple comparisons, and a to-be migrated file range determining module 303 for determining a range of files to be migrated according to the change patterns.

According to an embodiment of the present invention, the change types include: a first change type in which the file is present only in the source system environment, a second change type in which the file is present only in the target system environment, and a third change type in which the file is present both in the source system environment and in the target system environment but the contents of the file are different.

According to an embodiment of the present invention, the set of incremental target system environments include a first target system environment with only the operating system on which the migration target application depends installed, a second target system environment with the operating system and the middleware on which the migration target application depends installed, and a third target system environment with the operating system and the middleware on which the migration target application depends and the migration target application itself installed.

According to an embodiment of the present invention, the change pattern classifying module 302 comprises at least one of the following means:

means for classifying the files that belong to the first change type in the first comparison, to the first change type in the second comparison and to the first change type in the third comparison into a first change pattern;

means for classifying the files that belong to the first change type in the first comparison, to the first change type in the second comparison and to the third change type in the third comparison into a fourth change pattern;

means for classifying the files that belong to the first change type in the first comparison, to the third change type in the second comparison and to the third change type in the third comparison into a fifth change pattern;

means for classifying the files that belong to the third change type in the first comparison, to the third change type in the second comparison and to the third change type in the third comparison into a sixth change pattern, wherein the file difference between the source system environment and target system environment in the first comparison, the file difference between the source system environment and target system environment in the second comparison and the file difference between the source system environment and target system environment in the third comparison are the same;

and wherein the migrating file range determining module comprises: means for determining that the files in at least one of the first change pattern, the fourth change pattern, the fifth change pattern and the sixth change pattern belong to the range of files to be migrated.

According to a further embodiment of the present invention, the means for determining that the files in the first change pattern, the fourth change pattern, the fifth change pattern and the sixth change pattern belong to the range of files to be migrated further comprises:

means for, for the files in the first change pattern, clustering the files into ad-hoc configuration files, third-party components, middleware configuration files and other irrelevant files, and determining that the ad-hoc configuration files, third-party components and middleware configuration files belong to the range of files to be migrated;

means for, for the files in the fourth change pattern, determining that the files are application configuration files in an application archive, and determining that they belong to the range of files to be migrated;

means for, for the files in the fifth change pattern, clustering the files into middleware configuration files and irrelevant configuration files, and determining that the middleware configuration files belong to the range of files to be migrated; and means for, for the files in the sixth change pattern, clustering the files into operating system configuration files, middleware in the operating system configuration files and irrelevant operating system files, and determining that the operating system configuration files and middleware in the operating system configuration files belong to the range of files to be migrated.

According to an embodiment of the present invention, the change pattern classifying module 302 further comprises at least one of the following means:

means for classifying the files that belong to no change type in the first comparison, to the second change type in the second comparison and to the second change type in the third comparison into a second change pattern, wherein the file difference between the source system environment and target system environment in the second comparison and the file difference between the source system environment and target system environment in the third comparison are the same;

means for classifying the files that belong to the second change type in the first comparison, to the second change type in the second comparison and to the second change type in the third comparison into a third change pattern, wherein the file difference between the source system environment and target system environment in the first comparison, the file difference between the source system environment and target system environment in the second comparison and the file difference between the source system environment and target system environment in the third comparison are the same;

means for classifying the files that belong to the third change type in the first comparison, to the third change type in the second comparison and to the third change type in the third comparison into a seventh change pattern, wherein the file difference between the source system environment and target system environment in the first comparison and the file difference between the source system environment and target system environment in the second comparison are different, while the file difference between the source system environment and target system environment in the second comparison and the file difference between the source system environment and target system environment in the third comparison are the same;

means for classifying the files that belong to the first change type in the first comparison, to no change type in the second comparison and to no change type in the third comparison into an eighth change pattern, and means for classifying the files that belong to the first change type in the first comparison, to the first change type in the second comparison and to no change type in the third comparison into a ninth change pattern, and wherein the migrating file range determining module comprises at least one of the following means:

means for determining that the files in the second change pattern are irrelevant middleware files that are not to be migrated;

means for determining that the files in the third change pattern are irrelevant operating system files that are not to be migrated;

means for determining that the files in the seventh change pattern are irrelevant operating system files that are not to be migrated;

means for determining that the files in the eighth change pattern are middleware files already present in the second target system environment and the third target system environment and thus not to be migrated; and means for determining that the files in the ninth change pattern are migration target application files already present in the third target system environment and thus not to be migrated.

According to an embodiment of the present invention, the apparatus 300 further comprises a cleansing module 304 configured to cleanse irrelevant files including log files and temporary files from the change files before classifying change files into different change patterns.

According to an embodiment of the present invention, the apparatus 300 further comprises an optional target system environment creating module (not shown) configured to create the set of incremental target system environments. Of course, the function of this target system environment creating module may also be carried out artificially, so that the apparatus 300 may exclude this target system environment creating module.

According to an embodiment of the present invention, the apparatus 300 further comprises a further discovering module 305 configured to further discover configuration files and depended resources for migration from the files determined as belonging to the range of files to be migrated.

According to an embodiment of the present invention, the apparatus 300 further comprises an optional file migrating module (not shown) configured to migrate the files determined as belonging to the range of files to be migrated to the third target system environment after adjustment.

ILLUSTRATIVE EXAMPLES

Figure 4:
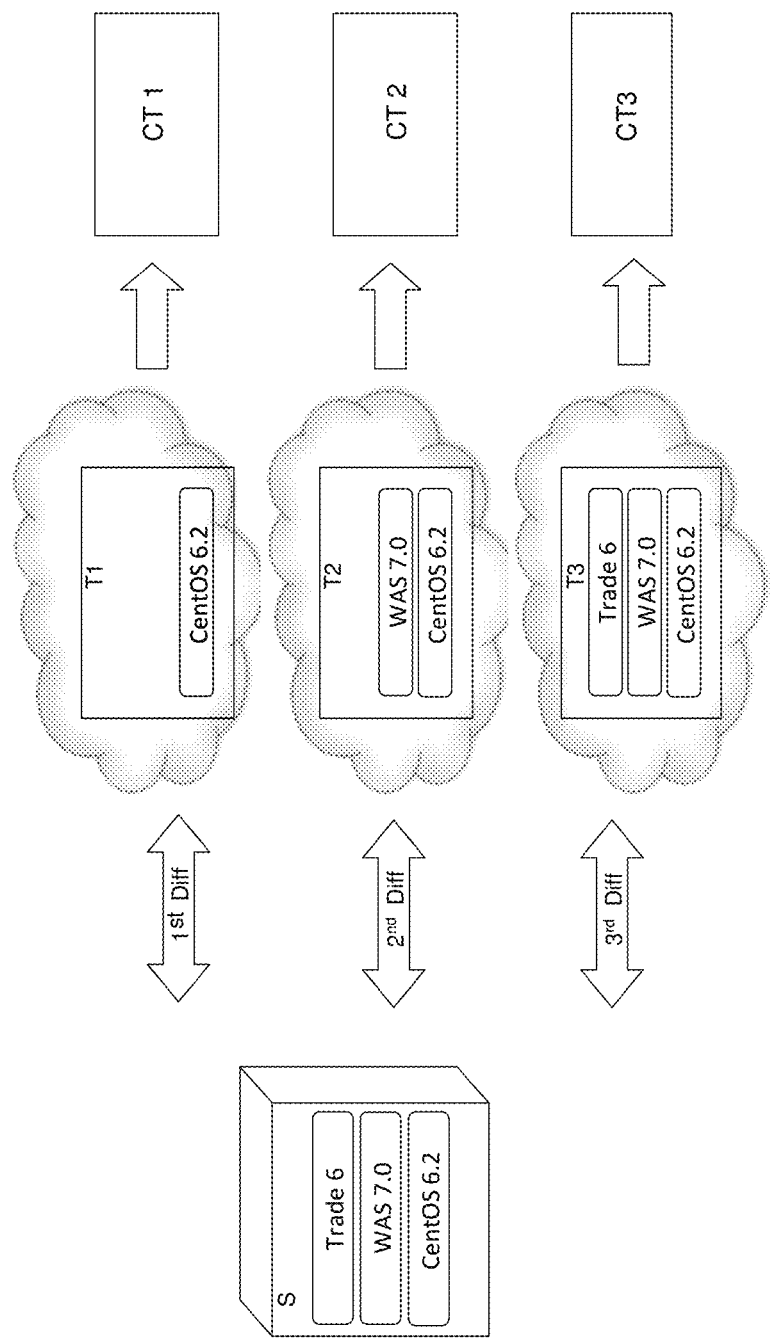
FIG. 4 shows an exemplary source system environment, a set of exemplary target system environments and a comparison process thereof.

FIG. 4 shows an exemplary source system environment, a set of exemplary target system environments and a comparison process thereof. As shown, the software stack in the exemplary source system environment S comprises an operating system CentOS6.2, middleware WAS 7.0 and migration target application Trade 6. The exemplary source system environment S may be a user's operating environment, and may comprise other software, components and various configurations not shown; the created target system environment T1 has the operating system CentOS 6.2 installed, the target system environment T2 has the middleware WAS 7.0 and operating system CentOS 6.2 installed, and the target system environment T3 has the migration target application Trade 6, middle WAS 7.0 and operating system CentOS 6.2 installed. The change files $1^{st}$ Diff generated by the first comparison of the source system environment S and the target system environment T1 are stored in the change table CT1, the change files $2^{nd}$ Diff generated by the second comparison of the source system environment S and the target system environment T2 are stored in the change table CT2, the change files $3^{rd}$ Diff generated by the third comparison of the source system environment S and the target system environment T3 are stored in the change table CT3.

FIG. 5 shows a summary of the change files in the change tables CT1, CT2, CT3 that are generated by the exemplary comparison process shown in FIG. 4, and a summary of the change files in the change table CT3 after the step of cleansing irrelevant files has been performed on CT3. As shown in FIG. 5, the source environments in each of the three comparisons 1, 2, 3 are the same, the target environments have operating system (OS), operating system and middle (OS+MW), operating system and middleware and migration target application (OS+MW+App) installed respectively, and the change tables generated are CT1, CT2, CT2 respectively. As shown in FIG. 5, the numbers of change files of the three change types generated respectively in the three comparisons, and the number of change files after cleansing is performed on the change files in the CT3 table, are recorded respectively in the three change tables CT1, CT2, CT3, the three change types being present only on the source, present only on the target, and present on both the source and target but the contents of the file being different.

FIG. 6 shows part of the exemplary contents in the change table CT1 that is generated by the exemplary comparison process shown in FIG. 4. As shown in FIG. 6, the change table CT1 is generated in the comparison between the source environment and target system environment with the operating system installed, and includes the numbers, filenames and change types of 23547 change files. In FIG. 6, F(y,0) being 1 indicates that the change file is present only on the source, F(0, y) being 1 indicates that the change file is present only on the target, and F(y, y) being 1 indicates that the change file is present on both the source and target but the contents are different.

FIG. 7 shows part of the exemplary contents in the change table CT2 that is generated by the exemplary comparison process shown in FIG. 4. As shown in FIG. 7, the change table CT2 is generated in the comparison between the source environment and the target system environment with the operating system and middleware installed, and includes the numbers, filenames and change types of 613 change files.

FIG. 8 shows part of the exemplary contents in the change table CT3 that is generated by the exemplary comparison process shown in FIG. 4. As shown in FIG. 8, the change table CT3 is generated in the comparison between the source environment and the target system environment with the operating system and middleware and migration target application installed, and includes the numbers, filenames and change types of 323 change files.

FIG. 9 shows part of the exemplary contents of the change table CT3 that is generated in the exemplary comparison process shown in FIG. 4 after the step of executing cleansing is performed thereon. As shown in FIG. 8, the cleansed change table CT3 includes the numbers, filenames and change types of 199 change files.

FIG. 10 shows the results of classifying the change files in the change tables CT1, CT2, CT3 that are generated in the exemplary comparison process shown in FIG. 4 into different change patterns according to their change types in each change table and their different change types among different change tables.

In FIG. 10, the change types of the change files in the change tables CT1, CT2, CT3 comprises: F(y,0)=1, indicating that the file in this comparison is present only in the source system environment and not in the target system environment; F(0,y)=1, indicating that the file in this comparison is not present in the source system environment and only in the target system environment; F(y,y)=1, indicating that the file in this comparison is present both in the source system environment and in target system environment, but the file contents in the source system environment and in target system environment are different. Furthermore, (CT1, CT2)=0 in Diff(y,y) indicates that the difference of the file between the source system environment and first target system environment in the first comparison and the difference of the file between the source system environment and the second target system environment in the second comparison are the same; (CT1,CT2)=1 in Diff(y,y) indicates that the difference of the file between the source system environment and first target system environment in the first comparison and the difference of the file between the source system environment and the second target system environment in the second comparison are different; N/A indicates not applicable. Similarly, (CT2,CT3) in Diff(y,y) indicates that the difference of the file between the source system environment and second target system environment in the second comparison and the difference of the file between the source system environment and the third target system environment in the third comparison are the same or different.

For example, in FIG. 10, the change types of the files in the first change pattern CP1 in the change table CT1 (i.e. the first comparison) are F(y,0)=1, i.e. these files are present only in the source system environment S but not in the target system environment T1; the change types of them in the change table CT2 (i.e. the second comparison) are F(y,0)=1, i.e. these file are present only in the source system environment S but not in the target system environment T2; the change types of them in the change table CT3 (i.e. the third comparison) are F(y,0)=1, i.e. these files are present only in the source system environment S but not in the target system environment T3.

In FIG. 10, the files in each change pattern are determined to be of some file type or further classified into several file types, which is carried out in the step 204 of determining a range of files to be migrated according to the change patterns and sub-step of clustering files in the step 204. For example, since the files in the first change pattern CP1 are present only in the source system environment but not in the target system environment in all the three comparisons, it can be determined that these files are introduced into the source system environment after installing the operating system, middleware and migration target application. These files are further clustered into ad-hoc configuration files, third party components, middleware configuration files and other irrelevant files. As another example, since the files in the second change pattern CP2 are present neither in the source system environment nor in the target system environment in the first comparison, are present only in the target system environment in the second comparison and third comparison, and the file difference between the source system environment and second target system environment in the second comparison and the file difference between the source system environment and the third target system environment in the third comparison are the same, i.e., there is no change in the file between the second target system environment and the third target system environment, it can be determined that these files are irrelevant middleware files introduced when installing middleware in creating the second target system environment, and so on. FIG. 10 further illustrates an example of each file type.

In FIG. 10, the file types that are determined as belonging to the range of files to be migrated and its change patterns are shown with a shadow background, and the file types that are determined as not belonging to the range of files to be migrated and the change patterns that do not comprise any file type belonging to the range of files to be migrated are shown with a white background. For example, the change pattern CP4 and the file type "application configuration file in an application archive" therein are determined as belonging to the range of files to be migrated, therefore shown with the shadow background. The file type "middleware configuration files" in the change pattern CP5 are determined as belonging to the range of files to be migrated, therefore shown with the shadow background, while the file type "irrelevant middleware file" in the change pattern CP5 is determined as not belonging to the range of files to be migrated, therefore shown with the white background.

For simplicity, other contents recorded in FIG. 10 and other figures are not described further in detail, however, it is to be appreciated that all the contents recorded in the figures are part of the disclosure of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It is also to be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for determining a range of files to be migrated, comprising:
   successively comparing, using a hardware processor, a source system environment having files of an existing software stack on which a target application to be migrated depends with a set of incremental target system environments;
   discovering, based on said successively comparing, the change files in each of the target system environments relative to the source system environment, wherein each target system environment in the set of incremental target system environments comprises files of one or more layers of said software stack on which the migration target application depends, and the software contained in the different target system environments is incremental, wherein each successive target system environment compared has files of an additional software layer of said software stack than a previous compared target system environment;
   classifying, using the hardware processor, the change files into different change patterns according to the change types of the change files in each comparison and the different change types of the change files among multiple comparisons, the change types comprising: a first change type in which the file is present only in the source system environment, a second change type in which the file is present only in the target system environment, and a third change type in which the file is present both in the source system environment and in the target system environment while the contents of file are different; and
   determining, using the hardware processor, a range of files to be migrated according to the change patterns, and
   migrating, using the hardware processor, the files of said range from the source system environment to the target system environment.

2. The method of claim 1, wherein the set of incremental target system environments include a first target system environment with only the operating system on which the migration target application depends installed, a second target system environment with the operating system and the middleware on which the migration target application depends installed, and a third target system environment with the operating system and the middleware on which the migration target application depends and the migration target application itself installed.

3. The method of claim 2, wherein the classifying the change files to different change patterns according to the change types of the change file in each comparison and the different change types of the change files among multiple comparisons comprises at least one of:
   classifying, using the hardware processor, the files that belong to the first change type in the first comparison, to the first change type in the second comparison and to the first change type in the third comparison into a first change pattern;
   classifying, using the hardware processor, the files that belong to the first change type in the first comparison, to the first change type in the second comparison and to the third change type in the third comparison into a fourth change pattern;
   classifying, using the hardware processor, the files that belong to the first change type in the first comparison, to the third change type in the second comparison and to the third change type in the third comparison into a fifth change pattern;
   classifying, using the hardware processor, the files that belong to the third change type in the first comparison, to the third change type in the second comparison and to the third change type in the third comparison into a sixth change pattern, wherein the file difference between the source system environment and target system environment in the first comparison, the file difference between the source system environment and target system environment in the second comparison and the file difference between the source system environment and target system environment in the third comparison are the same;
   and wherein the determining a range of files to be migrated according to the change patterns comprises: determining that the files in at least one of the first change pattern, the fourth change pattern, the fifth change pattern and the sixth change pattern belong to the range of files to be migrated.

4. The method of claim 3, wherein the determining that the files in at least one of the first change pattern, the fourth change pattern, the fifth change pattern and the sixth change pattern belong to the range of files to be migrated further comprises:
   for the files in the first change pattern, clustering, using the hardware processor, the files into ad-hoc configuration files, third-party components, middleware configuration files and other irrelevant files, and determining that the ad-hoc configuration files, third-party components and middleware configuration files belong to the range of files to be migrated;
   for the files in the fourth change pattern, determining, using the hardware processor, that the files are application configuration files in an application archive, and determining that they belong to the range of files to be migrated;
   for the files in the fifth change pattern, clustering, using the hardware processor, the files into middleware configuration files and irrelevant configuration files, and determining that the middleware configuration files belong to the range of files to be migrated; and
   for the files in the sixth change pattern, clustering, using the hardware processor, the files into operating system configuration files, middleware in the operating system configuration files and irrelevant operating system files, and determining that the operating system configuration files and middleware in the operating system configuration files belong to the range of files to be migrated.

5. The method of claim 2, wherein the classifying the change files to different change patterns according to the change types of the change files in each comparison and the different change types of the change files among multiple comparisons further comprises at least one of:
   classifying, using the hardware processor, the files that belong to no change type in the first comparison, to the second change type in the second comparison and to the second change type in the third comparison into a second change pattern, wherein the file difference between the source system environment and target system environment in the second comparison and the file difference between the source system environment and target system environment in the third comparison are the same;
   classifying, using the hardware processor, the files that belong to the second change type in the first comparison, to the second change type in the second comparison and to the second change type in the third comparison into a third change pattern, wherein the file difference between the source system environment and target system environment in the first comparison, the file difference between the source system environment and target system environment in the second comparison and the file difference between the source system environment and target system environment in the third comparison are the same;

classifying, using the hardware processor, the files that belong to the third change type in the first comparison, to the third change type in the second comparison and to the third change type in the third comparison into a seventh change pattern, wherein the file difference between the source system environment and target system environment in the first comparison and the file difference between the source system environment and target system environment in the second comparison are different, while the file difference between the source system environment and target system environment in the second comparison and the file difference between the source system environment and target system environment in the third comparison are the same;

classifying, using the hardware processor, the files that belong to the first change type in the first comparison, to no change type in the second comparison and to no change type in the third comparison into an eighth change pattern, and classifying, using the hardware processor, the files that belong to the first change type in the first comparison, to the first change type in the second comparison and to no change type in the third comparison into a ninth change pattern, and wherein the determining the range of files to be migrated according to the change patterns comprises at least one of:

determining, using the hardware processor, that the files in the second change pattern are irrelevant middleware files that are not to be migrated;

determining, using the hardware processor, that the files in the third change pattern are irrelevant operating system files that are not to be migrated;

determining, using the hardware processor, that the files in the seventh change pattern are irrelevant operating system files that are not to be migrated;

determining, using the hardware processor, that the files in the eighth change pattern are middleware files already present in the second target system environment and the third target system environment and thus not to be migrated; and determining, using the hardware processor, that the files in the ninth change pattern are migration target application files already present in the third target system environment and thus not to be migrated.

6. The method of claim 2, further comprises migrating, using the hardware processor, the files determined as belonging to the range of files to be migrated to the third target system environment after adjustment.

7. The method of claim 1, further comprises cleansing, using the hardware processor, irrelevant files including log files and temporary files before classifying the change files into different change patterns.

8. The method of claim 1, further comprises further discovering, using the hardware processor, configuration files and depended resources for migration from the determined range of files to be migrated.

9. An apparatus for determining a range of files to be migrated, said apparatus comprising a memory storage device and hardware processor coupled to the memory storage device, wherein the hardware processor is configured to:

successively compare the source system environment having files of an existing software stack to be migrated with a set of incremental target system environments;

discovering, based on said successively comparing, the change files in each target system environment relative to the source system environment, wherein each target system environment in the set of incremental target system environments comprises files of one or more layers of said software stack on which the migration target application depends, and the software contained in the different target system environments is incremental, wherein each successive target system environment compared has files of an additional software layer of said software stack than a previous compared target system environment;

classify the change files into different change patterns according to the change types of the change files in each comparison and the different change types of the change files among multiple comparisons, the change types comprising: a first change type in which the file is present only in the source system environment, a second change type in which the file is present only in the target system environment, and a third change type in which the file is present both in the source system environment and in the target system environment while the contents of file are different; and determine a range of files to be migrated according to the change patterns, and migrate the files of said range from the source system environment to the target system environment.

10. The apparatus of claim 9, wherein the set of incremental target system environments include a first target system environment with only the operating system on which the migration target application depends installed, a second target system environment with the operating system and the middleware on which the migration target application depends installed, and a third target system environment with the operating system and the middleware on which the migration target application depends and the migration target application itself installed.

11. The apparatus of claim 10, wherein the hardware processor is further configured to perform at least one of:

classify the files that belong to the first change type in the first comparison, to the first change type in the second comparison and to the first change type in the third comparison into a first change pattern;

classify the files that belong to the first change type in the first comparison, to the first change type in the second comparison and to the third change type in the third comparison into a fourth change pattern;

classify the files that belong to the first change type in the first comparison, to the third change type in the second comparison and to the third change type in the third comparison into a fifth change pattern;

classify the files that belong to the third change type in the first comparison, to the third change type in the second comparison and to the third change type in the third comparison into a sixth change pattern, wherein the file difference between the source system environment and target system environment in the first comparison, the file difference between the source system environment and target system environment in the second comparison and the file difference between the source system environment and target system environment in the third comparison are the same;

and wherein the hardware processor is further configured to:

determine that the files in at least one of the first change pattern, the fourth change pattern, the fifth change pattern and the sixth change pattern belong to the range of files to be migrated.

12. The apparatus of claim 11, wherein to determine that the files in at least one of the first change pattern, the fourth change pattern, the fifth change pattern and the sixth change pattern belong to the range of files to be migrated, the hardware processor is further configured to:

for the files in the first change pattern, cluster the files into ad-hoc configuration files, third-party components, middleware configuration files and other irrelevant files, and determine that the ad-hoc configuration files, third-party components and middleware configuration files belong to the range of files to be migrated;

for the files in the fourth change pattern, determine that the files are application configuration files in a application archive, and determine that they belong to the range of files to be migrated;

for the files in the fifth change pattern, cluster the files into middleware configuration files and irrelevant configuration files, and determine that the middleware configuration files belong to the range of files to be migrated; and for the files in the sixth change pattern, cluster the files into operating system configuration files, middleware in the operating system configuration files and irrelevant operating system files, and determine that the operating system configuration files and middleware in the operating system configuration files belong to the range of files to be migrated.

13. The apparatus of claim 10, wherein the change hardware processor is further configured to perform at least one of:

classify the files that belong to no change type in the first comparison, to the second change type in the second comparison and to the second change type in the third comparison into a second change pattern, wherein the file difference between the source system environment and target system environment in the second comparison and the file difference between the source system environment and target system environment in the third comparison are the same;

classify the files that belong to the second change type in the first comparison, to the second change type in the second comparison and to the second change type in the third comparison into a third change pattern, wherein the file difference between the source system environment and target system environment in the first comparison, the file difference between the source system environment and target system environment in the second comparison and the file difference between the source system environment and target system environment in the third comparison are the same;

classify the files that belong to the third change type in the first comparison, to the third change type in the second comparison and to the third change type in the third comparison into a seventh change pattern, wherein the file difference between the source system environment and target system environment in the first comparison and the file difference between the source system environment and target system environment in the second comparison are different, while the file difference between the source system environment and target system environment in the second comparison and the file difference between the source system environment and target system environment in the third comparison are the same;

classify the files that belong to the first change type in the first comparison, to no change type in the second comparison and to no change type in the third comparison into an eighth change pattern, and classify the files that belong to the first change type in the first comparison, to the first change type in the second comparison and to no change type in the third comparison into a ninth change pattern, and wherein the hardware processor is further configured to perform at least one of:

determine that the files in the second change pattern are irrelevant middleware files that are not to be migrated;

determine that the files in the third change pattern are irrelevant operating system files that are not to be migrated;

determine that the files in the seventh change pattern are irrelevant operating system files that are not to be migrated;

determine that the files in the eighth change pattern are middleware files already present in the second target system environment and the third target system environment and thus not to be migrated; and determine that the files in the ninth change pattern are migration target application files already present in the third target system environment and thus not to be migrated.

14. The apparatus of claim 10, wherein the hardware processor is further configured to migrate the files determined as belonging to the range of files to be migrated to the third target system environment after adjustment.

15. The apparatus of claim 9, wherein the hardware processor is further configured to cleanse irrelevant files including log files and temporary files from the change files before classifying change files to different change patterns.

16. The apparatus of claim 9, wherein the hardware processor is further configured to further discover configuration files and depended resources for migration from the files determined as belonging to the range of files to be migrated.

17. A computer program product readable by a machine, the program product comprising non-transitory computer readable media comprising program code executable by said machine to perform a method for determining a range of files to be migrated, said method comprising:

successively comparing the source system environment having files of an existing software stack to be migrated with a set of incremental target system environments;

discovering, based on said successively comparing, the change files in each of the target system environments relative to the source system environment, wherein each target system environment in the set of incremental target system environments comprises files of one or more layers of said software stack on which the migration target application depends, and the software contained in the different target system environments is incremental, wherein each successive target system environment compared has files of an additional software layer of said software stack than a previous compared target system environment;

classifying the change files into different change patterns according to the change types of the change files in each comparison and the different change types of the change files among multiple comparisons, the change types comprising: a first change type in which the file is present only in the source system environment, a second change type in which the file is present only in the target system environment, and a third change type in which the file is present both in the source system environment and in the target system environment while the contents of file are different; and determining a range of files to be migrated according to the change patterns, and migrating the files of said range from the source system environment to the target system environment.

\* \* \* \* \*